Oct. 18, 1938. A. O. LA DUCER 2,133,706
TAKE-OFF FITTING
Filed Dec. 12, 1936
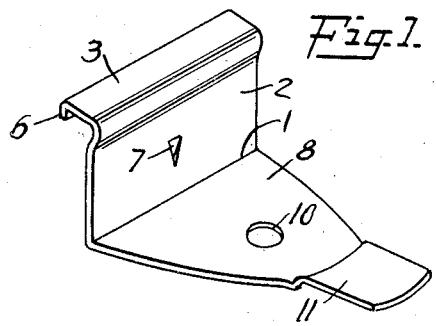
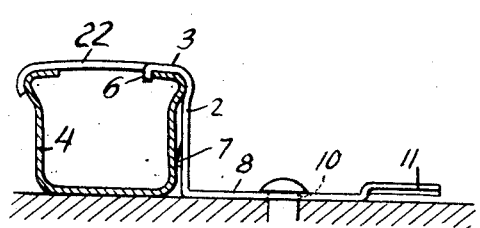
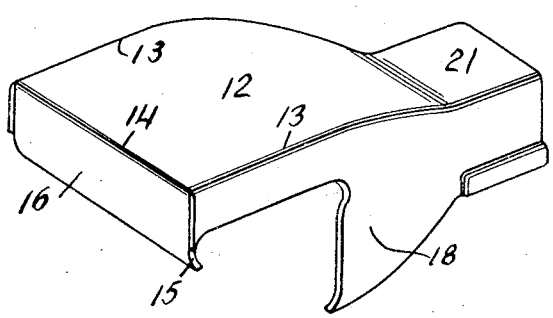
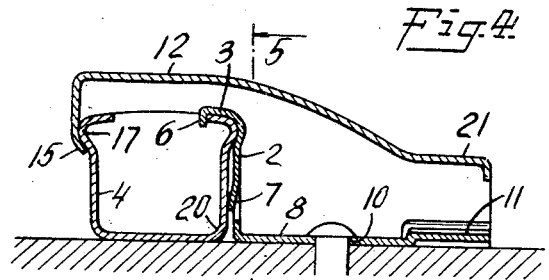
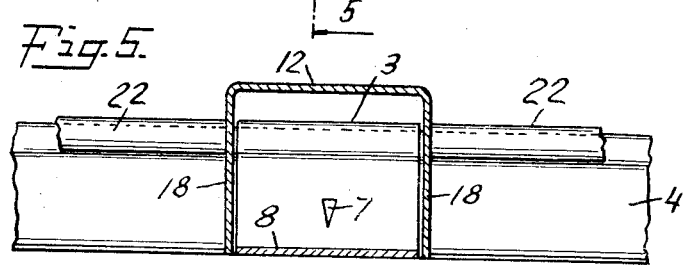
INVENTOR
ARTHUR O. LADUCER
BY
*Pennie, Davis, Marvin & Edmonds*
ATTORNEYS Patented Oct. 18, 1938

2,133,706

UNITED STATES PATENT OFFICE 2,133,706

TAKE-OFF FITTING

Arthur O. La Ducer, Hartford, Conn., assignor to The Wiremold Company, Hartford, Conn., a corporation of Connecticut Application December 12, 1936, Serial No. 115,504

4 Claims. (Cl. 247—28)

This invention relates to electric conduit fittings and more particularly to take-off fittings for electric conduits. In its more specific aspect the invention relates to a take-off fitting which may be readily attached to a channel-shaped electric conduit without interrupting the conduit.

When electrical wiring has been installed in a conduit system, it often becomes desirable to install branch conduits to supply additional electrical outlets for appliances or lighting equipment. Heretofore, whenever this condition arose, the customary procedure has been to disrupt the system by removing a strip of the main conduit from the floor, wall or ceiling to which it had been attached, removing the wiring from the conduit and cutting from the conduit a section of suitable length to permit insertion of a junction box. The main conduit must then again be secured in its original position and the desired branch conduit attached to the junction box. A serious objection to this supplementary wiring has been that an entire strip of the main conduit from which the branch is to lead must be removed, the conduit appropriately cut and fitted to a junction box, and the entire strip of conduit relaid.

The fitting of my invention eliminates substantially all of the difficulties heretofore encountered when installing branch conduits in conduit systems using channel-shaped conduits of the type installed with the open face of the channel away from the surface to which the conduit is attached. Where it is desired to install a branch conduit in such a conduit system with the take-off fitting of my invention, it is necessary only to remove the cover of the main conduit, remove a small section of the cover, tap off the new wires from those within the main conduit, replace the cover of the main conduit, and snap over the open portion of the conduit the take-off fitting of this invention. The fitting itself provides a cover for the main conduit at the junction and it may be secured readily to the branch conduit.

The fitting of my invention comprises two portions: a base member and a cover member. The base member comprises a strip of metal bent substantially midway between the ends in a right angle to form two legs. One leg is suitably bent adjacent its extremity to engage the top of one side of an open conduit whereby the base member may be hung by one leg over the side of the main conduit with the second leg in contact with the surface to which a branch conduit is to be attached. The end of the second leg is provided with means for engaging the base member of the branch conduit. The cover member comprises a substantially channel-shaped portion adapted at one end to engage and to cover the open top of the main conduit with the major axis of the cover member substantially perpendicular to the major axis of the main conduit. The other end of the cover member is adapted to engage the cover member of the branch conduit.

The construction and details of the fitting of this invention will be more fully understood by referring to the drawing wherein;

Fig. 1 is a perspective view of the base member of the take-off fitting;

Fig. 2 is a sectional view of a channel-shaped main conduit offering a side view of the base member and showing its connection to the main conduit and to the surface on which the conduit is mounted;

Fig. 3 is a perspective view of the cover member of the take-off fitting;

Fig. 4 is a sectional view of the entire take-off fitting attached to a main conduit; and Fig. 5 is a sectional end view of the entire fitting along line 5—5 in Fig. 4 and showing the position of the fitting with respect to a main conduit to which it is attached.

The base member of the take-off fitting as shown in Fig. 1 comprises a sheet metal stamping of appropriate form bent along line 1 approximately half way between its ends to form substantially a right angle. One leg 2 of the right angled base member is appropriately bent adjacent its extremity in a hook-shaped portion 3 adapted to engage the top of one side of a channel-shaped conduit 4 as shown in Fig. 2. The extreme end 6 of the hook-shaped portion is so bent that it is substantially parallel to the plane of leg 2 to prevent the base member from pulling away from the side of the conduit. Leg 2 is further provided with a punched projection 7 adapted to insure a grounding connection between the conduit and the base member. The other leg 8 of the base member is provided with a screw hole 10 for securing the base member to a flat surface, and adjacent its outer end it is provided with a tongue 11 adapted to engage the base portion of the branch conduit (not shown).

The cover member of the take-off fitting (Fig. 3) comprises a sheet metal stamping 12 bent along lines 13 and 14 to form a substantially channel-shaped member partially closed adjacent one end. Adjacent the lower edge, as at 15, the end wall is bent so as to engage the shoulder 17 of one side of the channel-shaped main conduit, to which the branch conduit is to connect.

The sides 18 of the cover member adjacent the closed end portion thereof are cut to have substantially the profile of the top and one side of the main conduit with but slightly greater dimensions. That is, the sides of the cover member are so cut that they may rest on the top of the two sides of the open main conduit and also engage the side of the open main conduit to which the base member of the take-off fitting is attached with the major axis of the cover member substantially perpendicular to the major axis of the main conduit. Thus the cover member is adapted to extend around substantially one half of the cross sectional periphery of the main conduit: from the shoulders 17 of one side of the conduit over the top to the base 20 of the other side of the conduit. The channel-shaped portion of the cover member of the take-off fitting that extends over the open face of the main conduit is of sufficient depth to permit conductors, tapped off from those in the main conduit, to be led out of the open face of the main conduit and over the upper extremity 3 of the base member of the take-off fitting when the latter is in engagement with the main conduit. The open end 21 of the take-off cover member may be appropriately tapered to a shape adapted to engage coaxially the cover member of the branch conduit.

To install the take-off fitting illustrated in the drawing, when it is desired to connect a branch conduit to a channel-shaped main conduit of the type illustrated, the cover 22 of the main conduit is removed and a section thereof cut out substantially equal in length to the width of the cover member of the take-off fitting. After the necessary tapping of wires has been made within the open main conduit, the conduit cover may be replaced. The base member of the take-off fitting is then hung upon the open top of one side of the main conduit as shown in Fig. 2 and secured to the surface to which the branch conduit is to be attached. The base member of the branch conduit may then be secured in place with its end overlapping the tongue of the take-off fitting base member. The branch conduit cover is then snapped over its base member. The bent closed end of the take-off fitting cover member is thereupon placed over the shoulder of the side of the main conduit opposite the base member of the fitting, the cover member swung downwardly over the base member (as shown in Fig. 4), and snapped over the branch conduit.

It will be seen from the foregoing description that the take-off fitting of my invention is of inexpensive and simple construction. It may be attached with facility to channel-shaped main conduits of the type described without cutting the main conduit to which it is to be attached. Furthermore, it permits complete grounding of the entire conduit system.

I claim:

1. In a take-off fitting for electric conduit systems, the improvement which comprises a substantially channel-shaped cover member adapted at one end to engage the open top of an electric conduit with the major axis of the cover member substantially perpendicular to the major axis of the conduit, and a base member having two legs substantially perpendicular to one another, one leg having a bent end portion adapted to engage the upper rim of one side of the open electric conduit.

2. In a take-off fitting for electric conduit systems of the type embodying a main conduit of generally channel-shaped cross-section, the improvement which comprises a cover member of generally channel-shaped cross-section tapered at one end to coaxially engage a branch conduit and partially closed by an end wall at the other end, the end wall and the portion of the side walls adjacent the closed end of said cover member being shaped to engage the sides of and to extend over the top of a main conduit with the major axis of the cover member perpendicular to the major axis of the main conduit, and an L-shaped base member the legs of which lie in substantially perpendicular planes, one leg being shaped to close the open face of the tapered portion of the cover member and the other leg being bent at the outer end to engage the top of the side wall of the open main conduit.

3. In a take-off fitting for electric conduit systems of the type embodying a main conduit of generally channel-shaped cross-section mounted with the open face of the channel away from the surface to which the conduit is attached, the improvement which comprises a cover member of generally channel-shaped cross-section tapered at one end to co-axially engage a branch conduit and partially closed by an end wall at the other end, the side walls of said cover member adjacent the closed end being cut to engage one side of and to extend over the open top of a main conduit with the major axis of the cover member perpendicular to the major axis of the main conduit, the portion of said side walls of the cover member adjacent the closed end being of sufficient depth to accommodate electrical conductors passing over the top of one side wall of the main conduit, the lower edge of the end wall of said cover member being extended to a point below the upper edge of the cut-away portions of the side walls of the cover member and shaped to engage the upper portion of the other side wall of the main conduit.

4. In a take-off fitting for electrical systems of the type embodying a main conduit of generally channel-shaped cross-section, the improvement which comprises a cover member of generally channel-shaped cross-section shaped at one end to co-axially engage a branch conduit and partially closed by an end wall at the other end, the said end wall and the portion of the side walls adjacent the closed end of said cover member being shaped to engage the sides of and to extend over the top of a main conduit with the major axis of the cover member perpendicular to the major axis of the conduit, the portion of the side walls of the cover member adjacent the closed end and extending over the main conduit being of sufficient depth to accommodate electrical conductors passing over the top of the side wall of the main conduit which is adjacent the branch conduit.

ARTHUR O. LA DUCER.